United States Patent
Rathinavelu et al.

(10) Patent No.: US 12,487,647 B2
(45) Date of Patent: Dec. 2, 2025

(54) ELECTRONIC DEVICE VENTING SYSTEM

(71) Applicant: Bard Access Systems, Inc., Salt Lake City, UT (US)

(72) Inventors: Ramesh Rathinavelu, Salt Lake City, UT (US); Jon B. Newman, Centerville, UT (US); Amir Orome, Sandy, UT (US)

(73) Assignee: Bard Access Systems, Inc., Salt Lake City, UT (US)

( * ) Notice: Subject to any disclaimer, the term of this patent is extended or adjusted under 35 U.S.C. 154(b) by 632 days.

(21) Appl. No.: 17/586,606

(22) Filed: Jan. 27, 2022

(65) Prior Publication Data
US 2022/0240396 A1    Jul. 28, 2022

Related U.S. Application Data

(60) Provisional application No. 63/142,353, filed on Jan. 27, 2021.

(51) Int. Cl.
| | | |
|---|---|---|
| *G06F 1/20* | (2006.01) | |
| *B08B 3/02* | (2006.01) | |
| *B08B 3/04* | (2006.01) | |
| *H05K 5/02* | (2006.01) | |

(52) U.S. Cl.
CPC .................. *G06F 1/20* (2013.01); *B08B 3/02* (2013.01); *B08B 3/04* (2013.01); *H05K 5/0214* (2022.08)

(58) Field of Classification Search
CPC ............... H05K 5/0213; H05K 5/0214; H05K 7/20009; B08B 3/02; B08B 3/04; G06F 1/20
See application file for complete search history.

(56) References Cited

U.S. PATENT DOCUMENTS

| | | | | |
|---|---|---|---|---|
| 6,151,906 A | * | 11/2000 | da Silva | F24F 1/027 |
| | | | | 62/279 |
| 6,445,568 B1 | * | 9/2002 | Baur | B60R 16/0239 |
| | | | | 174/547 |
| 7,521,848 B2 | * | 4/2009 | Kim | H05K 5/0214 |
| | | | | 313/493 |

FOREIGN PATENT DOCUMENTS

| | | |
|---|---|---|
| EP | 2278433 A2 | 1/2011 |
| EP | 2804453 A2 | 11/2014 |
| JP | 09307247 A * | 11/1997 |

OTHER PUBLICATIONS

PCT/US2022/014138 filed Jan. 27, 2022 International Search Report and Written Opinion dated May 11, 2022.

* cited by examiner

*Primary Examiner* — Allen R. B. Schult
(74) *Attorney, Agent, or Firm* — Rutan & Tucker LLP

(57) ABSTRACT

Disclosed herein is a venting system for an electronic device. The electronic device having a body defining an internal cavity having one or more electronic systems disposed within the internal cavity. The venting system includes a plurality of fins defining a plurality of vent apertures in fluid communication with the internal cavity. One or more of the plurality of the fins includes one or more fin channels configured to direct fluid away from the vent apertures and the fins to one or more drainage channels.

19 Claims, 10 Drawing Sheets

ELECTRONIC DEVICE VENTING SYSTEM

PRIORITY

This application claims the benefit of priority to U.S. Provisional Application No. 63/142,353, filed Jan. 27, 2021, which is incorporated by reference in its entirety into this application.

BACKGROUND

Cleaning procedures for cleaning and sterilizing electronic equipment, especially medical devices, can be challenging. Most cleaning procedures require harsh chemicals and other fluids that have the potential to permeate or seep into the electronic systems, causing long term damage to the equipment. It would be beneficial to producers and consumers of electronic equipment to have a venting system that allows air intake to cool the electronic system and avoids fluid ingress during cleaning procedures. Disclosed herein is a system and method that address the foregoing.

SUMMARY

Disclosed herein is a venting system for an electronic device. The electronic device having a body defining an internal cavity having one or more electronic systems disposed within the internal cavity. The venting system includes a plurality of fins defining a plurality of vent apertures in fluid communication with the internal cavity. One or more of the plurality of the fins includes one or more fin channels configured to direct fluid away from the vent apertures and the fins to one or more drainage channels.

In some embodiments, the venting system is coupled to the body of the electronic device or integrated into the body of the electronic device.

In some embodiments, the one or more fin channels runs from interior the electronic device to exterior the electronic device.

In some embodiments, the one or more fin channels and the drainage channels include open channels.

In some embodiments, the plurality of fins and the plurality of vent apertures are organized into one or more vertical or horizontal columns.

In some embodiments, the drainage channels are oriented vertically and are adjacent to the plurality of fins.

In some embodiments, each of the fin channels include a fin channel width, a fin channel length extending from a top of the fin to a bottom of a fin and a fin channel depth.

In some embodiments, the fin channel width is consistent along the entire fin channel length or increases or decreases along the fin channel length.

In some embodiments, the fin channel depth is consistent along the entire fin channel length or increases or decreases along the fin channel length.

In some embodiments, one or more of the fin channels is U-shaped, C-shaped, or V-shaped.

In some embodiments, the one or more drainage channels are U-shaped, C-shaped, or V-shaped.

In some embodiments, the one or more fin channels or the one or more drainage channels include enclosed channels.

In some embodiments, the drainage channels include microfluidic tubes.

In some embodiments, at least a portion of each fin of the plurality of fins includes a hydrophobic coating or a plurality of super-hydrophobic structures.

In some embodiments, the one or more drainage channels include a hydrophobic coating or a plurality of super-hydrophobic structures.

In some embodiments, the plurality of fins are sloped downward at an angle through the range of 0° to −70° in relation to a top of the electronic device.

In some embodiments, each fin of the plurality of fins includes a fin length and a fin width.

In some embodiments, the fin width is greater than or equal to the fin length or the fin width is less than the fin length.

In some embodiments, the fin channel length is less than or equal to the fin length.

Also disclosed herein is a method of cleaning an electronic device including applying a cleaning fluid to an electronic device having an internal cavity including one or more electronic systems therein, where the electronic device includes a venting system having a plurality of fins defining a plurality of vent apertures, the fins having a plurality of fin channels in fluid communication with two or more drainage channels, and the plurality of vent apertures in fluid communication with the internal cavity, and directing the cleaning fluid through the fin channels away from the plurality of vent apertures to the drainage channels, to mitigate fluid ingress into the electronic device cavity.

In some embodiments, directing the cleaning fluid through the fin channels away from the plurality of vent apertures to the drainage channels includes using gravity flow.

In some embodiments, applying a cleaning fluid to the electronic device includes applying the cleaning fluid directly to the electronic device.

In some embodiments, applying a cleaning fluid to the electronic device includes applying the cleaning fluid indirectly to the electronic device by applying the cleaning fluid to a cleaning apparatus and applying to cleaning apparatus to the electronic device.

In some embodiments, applying a cleaning fluid to the electronic device includes spraying the cleaning fluid onto the electronic device, misting the cleaning fluid onto the electronic device, dripping the cleaning fluid onto the electronic device, or submerging the electronic device into the cleaning fluid.

In some embodiments directing the cleaning fluid through the fin channels away from the plurality of vent apertures to the drainage channels includes using a hydrophobic coating on a portion of the plurality of fins or a portion of the plurality of fin channels to direct the cleaning fluid.

In some embodiments, directing the cleaning fluid through the fin channels away from the plurality of vent apertures to the drainage channels includes using a plurality of super-hydrophobic structures on a portion of the plurality of fins or a portion of the plurality of fin channels to direct the cleaning fluid.

These and other features of the concepts provided herein will become more apparent to those of skill in the art in view of the accompanying drawings and following description, which describe particular embodiments of such concepts in greater detail.

DRAWINGS

A more particular description of the present disclosure will be rendered by reference to specific embodiments thereof that are illustrated in the appended drawings. It is appreciated that these drawings depict only typical embodiments of the infinion and are therefore not to be considered limiting of its scope. Example embodiments of the infinion will be described and explained with additional specificity and detail through the use of the accompanying drawings in which.

DESCRIPTION

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "top," "bottom," "front," "back," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

The term "electronic device" should be construed as devices that includes electronics therein or thereon. Examples of an electronic device may include, but are not limited or restricted to, the following: medical devices such as monitors, ultrasound probes, surgical instruments, fluid collecting systems, EKG machines and the like. The term "computing device" should be construed as electronics with the data processing capability and/or a capability of connecting to any type of network, such as a public network (e.g., Internet), a private network (e.g., a wireless data telecommunication network, a local area network "LAN", etc.), or a combination of networks. Examples of a computing device may include, but are not limited or restricted to, the following: a server, an endpoint device e.g., a laptop, a smartphone, a tablet, a "wearable" device such as a smart watch, augmented or virtual reality viewer, or the like, a desktop computer, a netbook, a medical device, or any general-purpose or special-purpose, user-controlled electronic device or the like.

As used herein, the term "fluid" includes a gas, a liquid, or combination of both (e.g., water vapor, a mist, droplets or the like).

Unless defined otherwise, all technical and scientific terms used herein have the same meaning as commonly understood by those of ordinary skill in the art.

Figure 1:
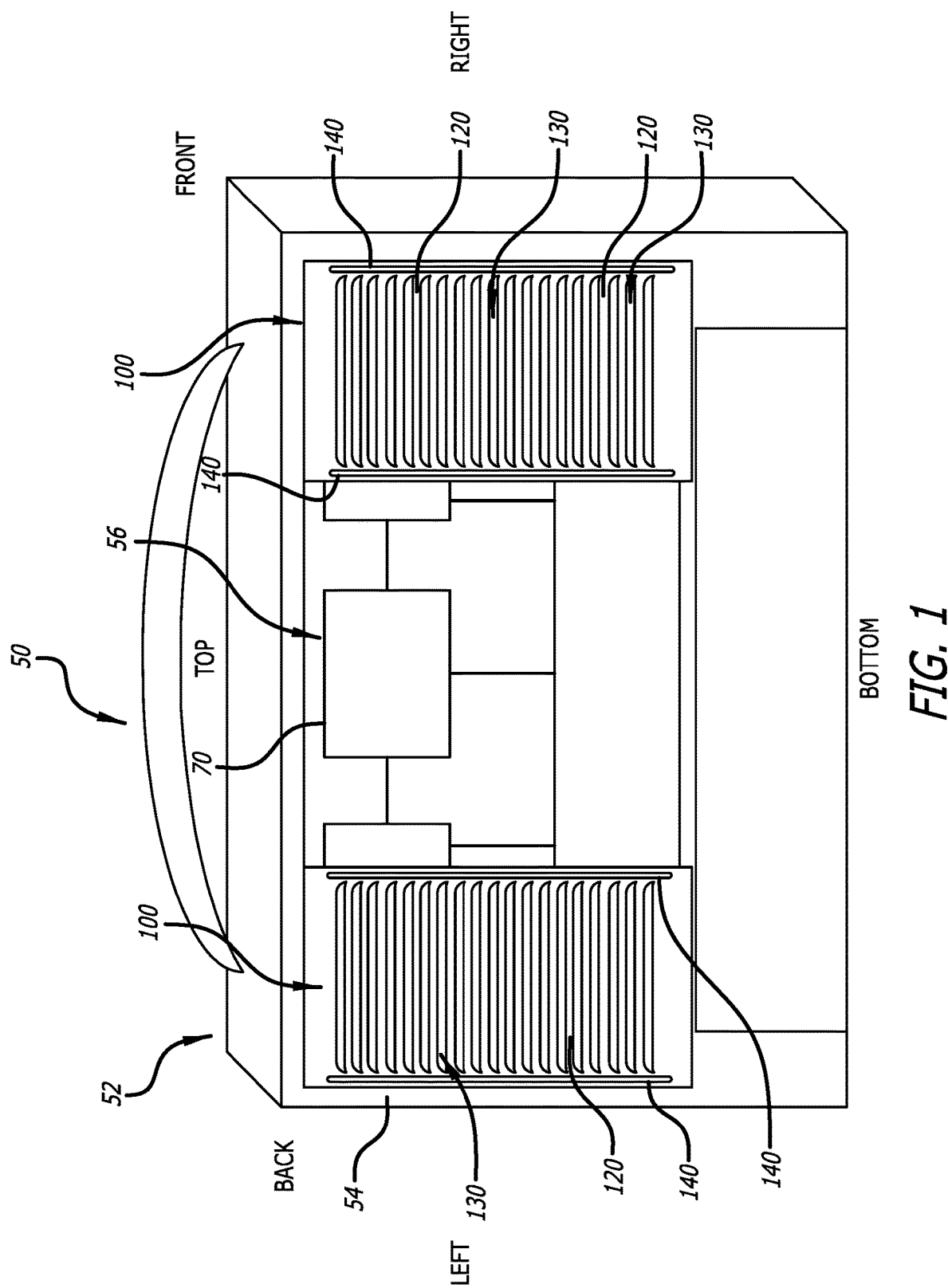
FIG. 1 illustrates a perspective view of an electronic device including a venting system, in accordance with some embodiments.

FIG. 1 illustrates a perspective view of an electronic device 50 including a venting system 100, in accordance with some embodiments. The electronic device 50 includes a body 52 having an external surface 54 and an internal cavity 56 therein. In some embodiments, the body 52 may be a substantially cuboid shape, however, it will be appreciated that other three-dimensional shapes are also contemplated including a triangular prism, a cube, a sphere, a cylinder, a cone, an irregular polygon or the like. In some embodiments, the body 52 may include a front side, a back side, a left side, a right side, a top side, and a bottom side. In some embodiments, the internal cavity 56 includes one or more electronic systems 70 disposed therein. In some embodiments, the internal cavity 56 may also include other sensitive components therein.

In some embodiments, the electronic device 50 may include a venting system 100 configured to be in fluid communication with the internal cavity 56 and provide fluid communication between the internal cavity 56 and the external surface 54, for example, to allow a flow of air to dissipate heat from the electronics systems 70 disposed therein. In some embodiments, the venting system 100 includes a plurality of fins 120 defining a plurality of vent apertures 130, the plurality of vent apertures 130 may be configured to connect the internal cavity 56 with the external surface 54. The plurality of vent apertures 130 may be configured to allow for air exchange over the plurality of vent apertures 130 into the internal cavity 56 to dry any fluid on the plurality of vent apertures 130 and dissipate heat from the one or more electronic systems 70 therein. In some embodiments, the plurality of vent apertures 130 may allow for the passive exchange of air. In some embodiments, the plurality of vent apertures 130 may allow for the active exchange of air. For example, the internal cavity 56 may include mechanical means for actively exchanging air (e.g., a fan configured to draw air into or dispel air out of the internal cavity 56 or the like). In some embodiments, the venting system 100 further includes one or more drainage channels 140, configured to drain fluid from the plurality of fins 120 and the plurality of vent apertures 130 that will be described in more detail herein. In some embodiments, the drainage channels 140 may include open channels.

In some embodiments, the venting system 100 may be formed as a separate structure and coupled to the external surface 54 of the electronic device 50 or may be formed integrally with the body 52. In some embodiments, as illustrated in FIG. 1, the venting system 100 may be located at the back side of the electronic device 50 or may be located at the front side of the electronic device 50. It can be appreciated that the venting system 100 can be located anywhere on the electronic device 50. Although electronic devices such as medical devices (e.g., ultrasound consoles, ultrasound probes, displays, ventilators, portable X-ray machines or the like) are disclosed, it can be appreciated that other electronic devices such as computing devices may include the venting system 100 and are considered. Advantageously, the venting system 100 provides dual purposes: directing airflow through the plurality of vent apertures 130 to cool the one or more electronic systems 70 within the internal cavity 56 to prevent overheating and directing fluid from the plurality of fins 120 to the two or more drainage channels 140 to preserve the electronic systems 70 and other sensitive internal components and to reduce failure of the electronic systems 70 from ingress of fluids.

Figure 2:
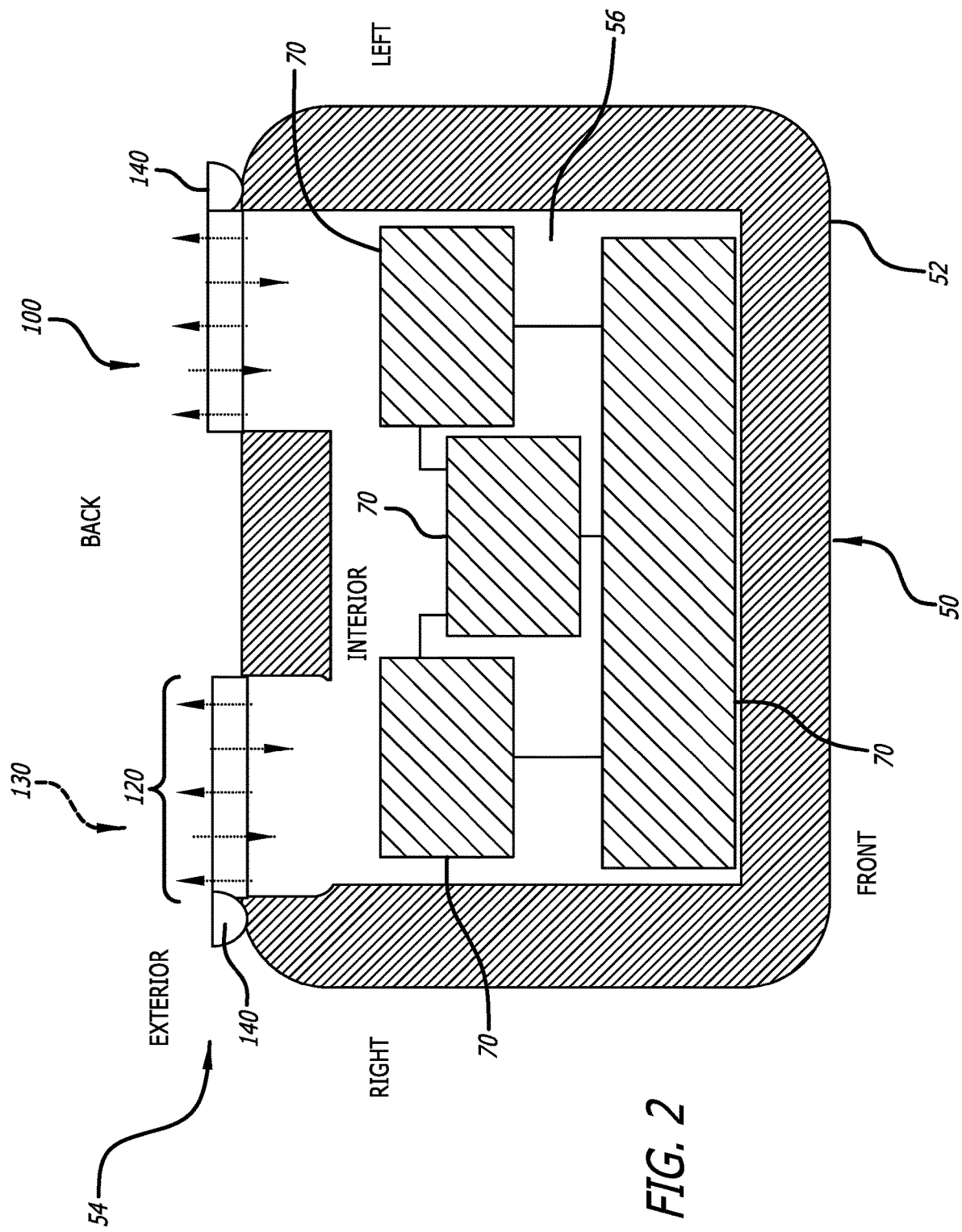
FIG. 2 illustrates a plan view of the electronic device, including the venting system, in accordance with some embodiments.

FIG. 2 illustrates a plan view of the electronic device 50, including the venting system 100, in accordance with some embodiments. In some embodiments, the electronic device 50 includes the body 52 having the external surface 54 and the internal cavity 56 configured to contain the one or more electrical systems 70 therein. The venting system 100 includes the plurality of fins 120 defining the plurality of vent apertures 130 providing fluid communication between the internal cavity 56 and the external surface 54. Air may be drawn into or may flow out of the internal cavity 56 through the plurality of vent apertures 130. The continual air flow through the plurality of vent apertures 130 may be configured to cool the one or more electronic systems 70 within the internal cavity 56. In some embodiments, the electronic device 50 may undergo a cleaning procedure that includes one or more solutions or fluids applied to the electronic device 50. The one or more solutions or fluids may ingress into the internal cavity 56 or pool on the plurality of fins 120. The continual air flow through the plurality of vent apertures 130 may be configured to help dry any fluid within the internal cavity 56 or on the plurality of fins 120.

Figure 3:
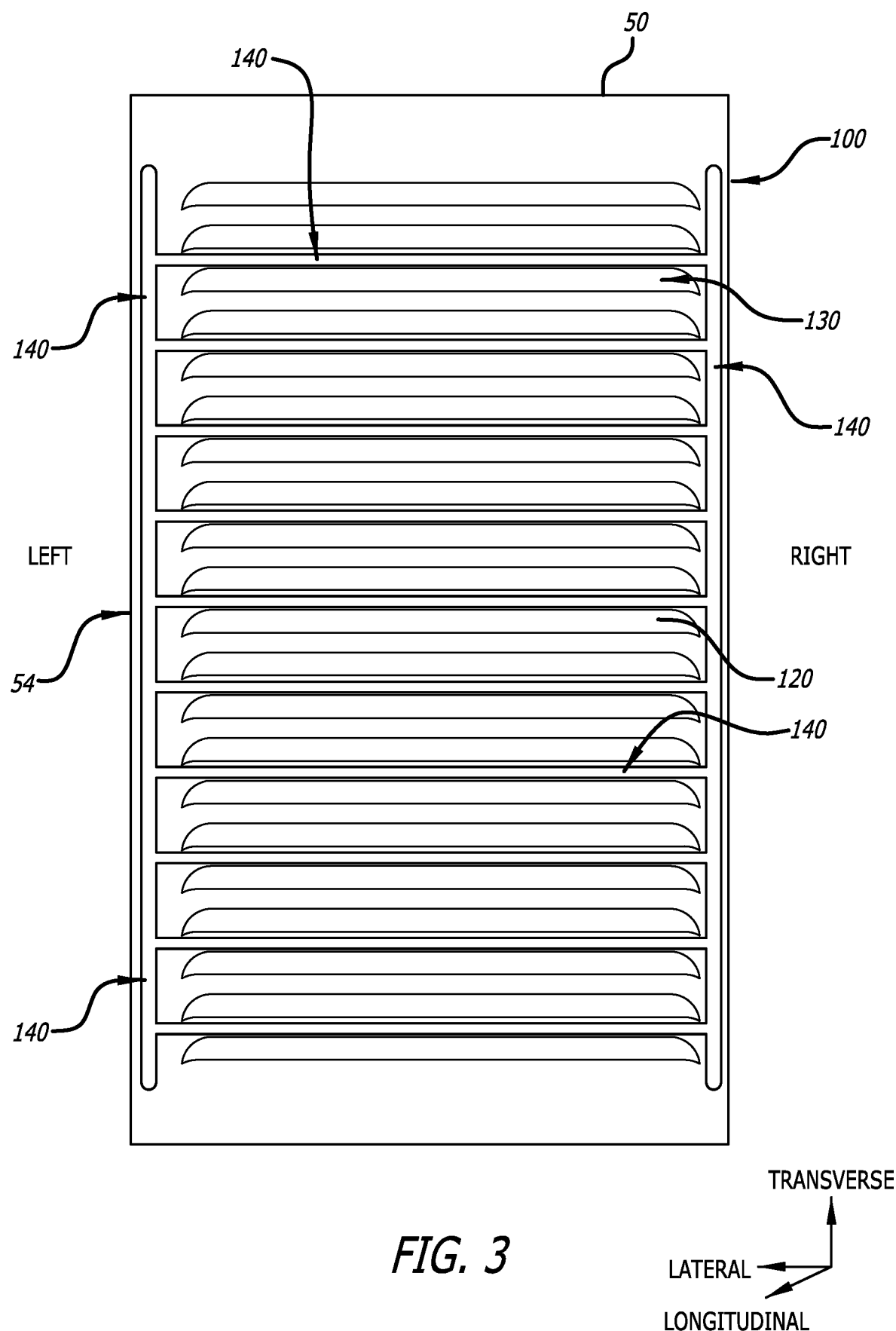
FIG. 3 illustrates a plan view of the venting system, in accordance with some embodiments.

FIG. 3 illustrates a plan view of the venting system 100, in accordance with some embodiments. The venting system 100 includes the plurality of fins 120 defining the plurality of vent apertures 130. The venting system 100 includes the two or more drainage channels 140. In some embodiments, the drainage channels 140 may be formed or integrated into the external surface 54. In some embodiments, the drainage channels 140 may be imprinted, carved, stamped or the like into the external surface 54. In some embodiments, the drainage channels 140 may be organized in various configurations including vertically (e.g., top to bottom), horizontally (e.g., left to right) or a combination thereof. For example, as illustrated in FIG. 3, the drainage channels 140 may be located laterally adjacent the plurality of fins 120. In some embodiments, the drainage channels 140 may further include horizontal drainage channels in fluid communication with the vertical drainage channels, as illustrated in FIG. 3. The horizontal drainage channels may be located on each fin of the plurality of fins 120 or on some fins of the plurality of fins 120. In some embodiments, the plurality of fins 120 direct fluid to the horizontal drainage channels and the horizontal drainage channels may direct the fluid to the vertical drainage channels.

Figure 4A:
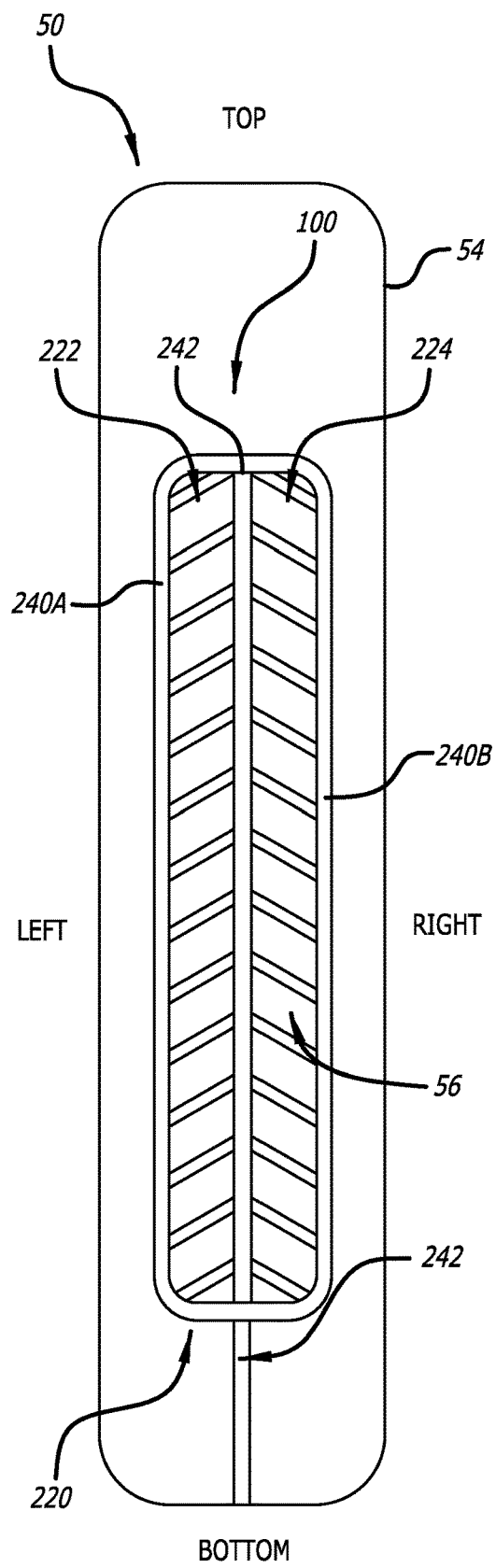
FIGS. 4A-4B illustrate plan views of different embodiments of the venting system, in accordance with some embodiments.
Figure 4B:
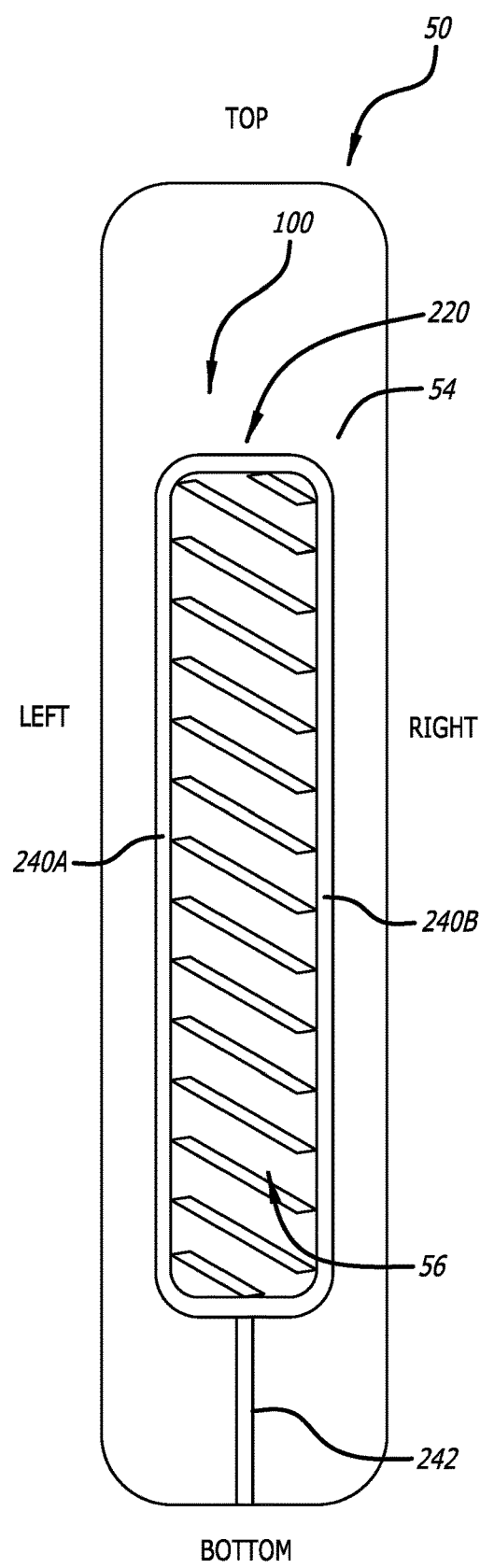

FIGS. 4A-4B illustrate a plan view of different configurations of the venting system 100 coupled to the electronic device 50, in accordance with some embodiments. In some embodiments, the plurality of fins 120 defining the plurality of vent apertures 130 may be organized into one or more vertical columns, one or more horizontal columns or a combination thereof. In some embodiments, the venting system 100 may include a central drainage channel 242 configured to collect the fluid flow from the drainage channels 240A/240B, located lateral the central drainage channel 242. In some embodiments, the plurality of fins 120 may be angled or sloped to funnel fluid to the drainage channels 240A/240B. As illustrated in FIG. 4A, the plurality of fins 220 may be arranged in a column, including a right fin column 224, angled and extending from the central drainage channel 242 to the right drainage channel 240B and a left fin column 222, angled and extending from the central drainage channel 242 to the left drainage channel 240A, the right fin column 224, the left fin column 22 and the central drainage channel 242 forming an inverted V shape. Advantageously, the plurality of fins 220 can be arranged to create turbulent flow in order to collect and direct any fluid on or around the venting system 100 to the left and right drainage channels 240A/240B and the central drainage channel 242. Furthermore, the air flowing into the internal cavity 56 through the plurality of vent apertures 130 may be configured to create a type of vortex, cooling the internal cavity 56 and preventing fluid from being established around the venting system 100, instead directing the fluid to the left and right drainage channels 240A/240B and the central drainage channel 242. This configuration of the left and right drainage channel 240A/240B and the central drainage channel 242 may be configured to help remove fluid around the venting system 100, easing the cleaning process around the venting system 100.

In some embodiments, the venting system 100 may include the left drainage channel 240A and the right drainage channel 240B. In some embodiments, the plurality of fins 120 may extend from the left drainage channel 240A to the right drainage channel 240B, arranged in a column of fins 120. For example, as illustrated in FIG. 4B, the column of fins 120 may be configured to extend and angle from the left drainage channel 240A to the right drainage channel 240B. In some embodiments, the left drainage channel 240A and the right drainage channel 240B may merge into the central drainage channel 242. Advantageously, this configuration may allow an increase in air flow through the plurality of vent apertures 130 into the internal cavity 56.

Figure 5:
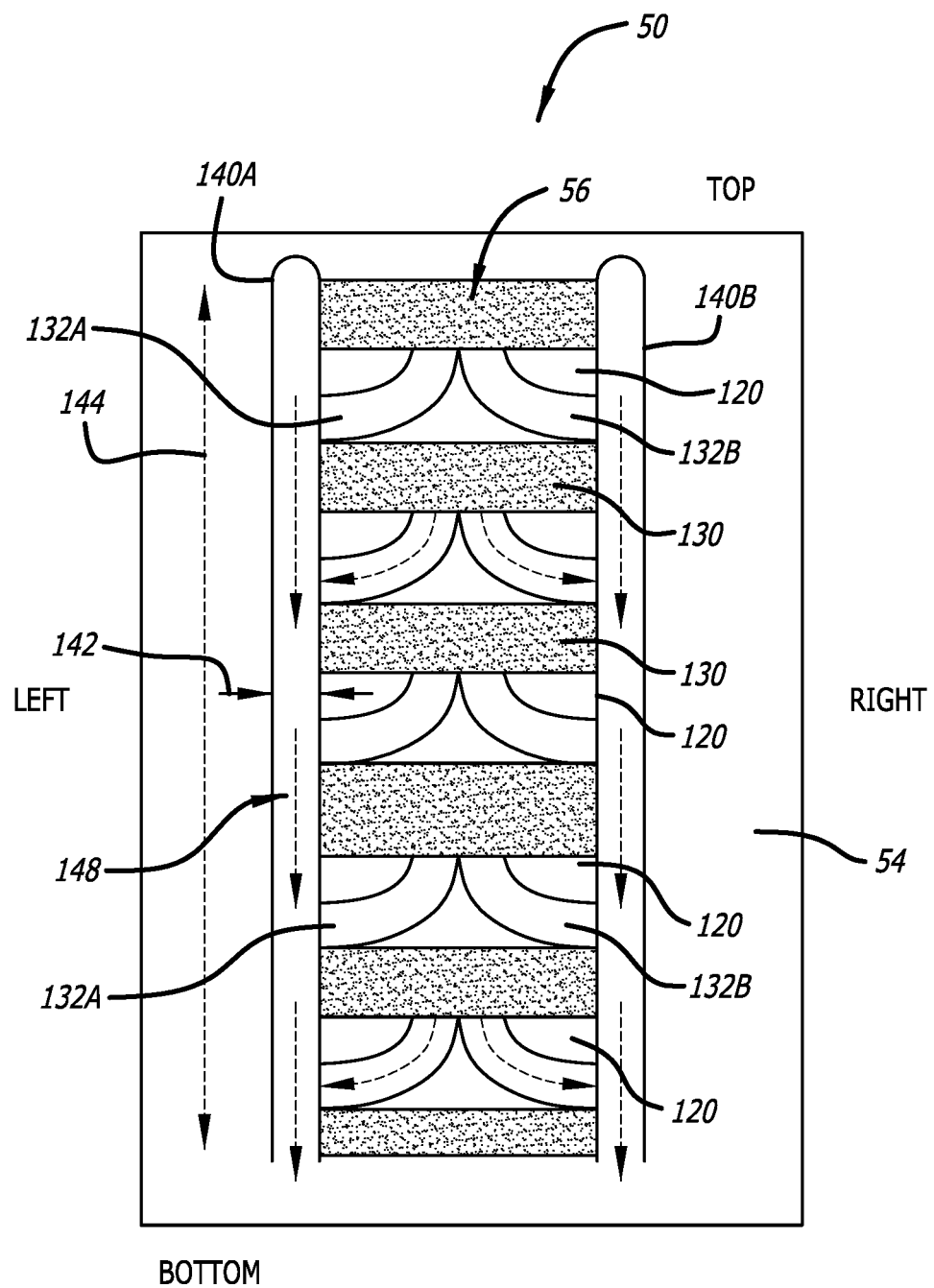
FIG. 5 illustrates a plan view of the venting system, in accordance with some embodiments.

FIG. 5 illustrates a plan view of the venting system 100, in accordance with some embodiments. In some embodiments, the plurality of fins 120 may include a plurality of fin channels 132 configured to channel fluid on the plurality of fins 120 to the drainage channels 140. In some embodiments, the fin channels 132 may be open channels or closed channels. The plurality of fin channels 132 may be configured to be in fluid communication with the vertical drainage channels 140, horizontal drainage channels 140 or a combination thereof. The plurality of fin channels 132 may be configured in a variety of shapes and run from interior the electronic device 50 to exterior the electronic device 50 (e.g. from the internal cavity 56 towards the external surface 54). In some embodiments, one of more of the fin channels 132 may be U-shaped, C-shaped, V-shaped, or the like. As illustrated in FIG. 5, the venting system 100 may include a left drainage channel 140A, a right drainage channel 140B, with each fin 120 having a left fin channel 132A and a right fin channel 132B. In some embodiments, the left fin channel 132A may be in fluid communication with the left drainage channel 140A and the right fin channel 132B may be in fluid communication with the right drainage channel 140B. Air may enter the internal cavity 56 through the plurality of vent apertures 130 and fluid may be drained from the plurality of fins 120 into any one of the left fin channels 132A or right fin channels 132B, further moving to the left drainage channel 140A or the right drainage channel 140B and off the external surface 54 of the device 50. The plurality of fins 120 may be organized in various configurations to use gravity flow for draining fluid from the electronic device 50 using the venting system 100. In some embodiments, the plurality of fins 120 may be sloped or angled towards the bottom of the device 50 as will be described in more detail herein. In some embodiments, the plurality of fins 120 may be sloped from the left side to the right side or from the right side to the left side. In some embodiments, the plurality of fins 120 may be sloped towards the bottom of the device 50 and sloped from the left side to the right side or from the right side to the left side.

In some embodiments, the plurality of fins 120 may include a water repellent coating or a hydrophobic coating. In some embodiments, a portion of the fin 120 or the entire fin 120 may be configured to be covered with the hydrophobic coating. For example, the hydrophobic coating may be configured to cover just the one or more fin channels 132. In some embodiments, the plurality of fins 120 may include super hydrophobic structures thereon. In some embodiments, the super hydrophobic structures on the fin may be configured to direct fluid towards the one or more fin channels 132.

The one or more drainage channels 140 may be configured to maximize gravity flow for draining fluid from the electronic device 50. As illustrated in FIG. 5, the drainage channels 140 may include a drainage channel width 142, a drainage channel length 144, and a drainage channel depth 148. The drainage channels may be U-shaped, C-shaped, V-shaped, or the like. The drainage channel width 142 and the drainage channel depth 146 may be tapered along the drainage channel length 144. For example, the drainage channel width 142 may increase, decrease or the stay the same along the drainage channel length 144. The drainage channel depth 142 may increase, decrease or stay the same along the drainage channel length 144. In some embodiments, the drainage channels 140 may be opened channels on the external surface 54 of the electronic device 50 or may be closed channels within the electronic device. In some embodiment, the drainage channels 140 may include enclosed channels or microfluidic tubes. In some embodiments, a portion of or the entire drainage channels 140 may include a hydrophobic coating or a plurality of super-hydrophobic structures.

Figure 6A:
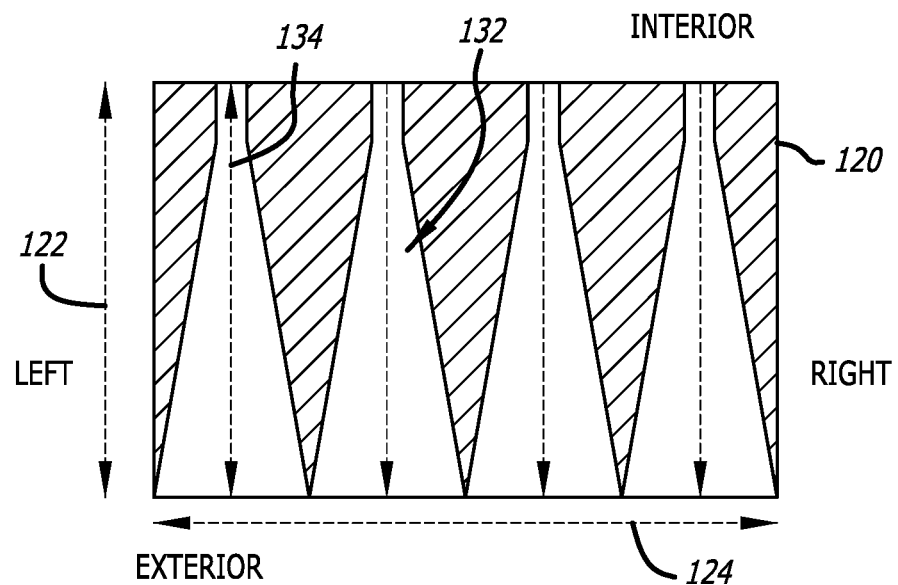
FIG. 6A illustrates a plan view of a fin, including one or more fin channels, in accordance with some embodiments.

FIG. 6A illustrates a plan view of a fin 120 of the venting system 100, in accordance with some embodiments. In some embodiments, the fin 120 may have a fin length 122 and a fin width 124. In some embodiments, the fin width 124 may be greater than, less than or equal to the fin length 122. The fin 120 may be configured to have the one or more fin channels 132 configured to funnel fluid to the one or more drainage channels 140. The fin channels 132 may be orientated from the interior to the exterior. As used herein, interior includes towards the internal cavity 56 and exterior includes towards the external surface 54. In some embodiments, the one or more fin channels 132 may include a fin channel length 134. In some embodiments, the fin channel length 134 may be equal to or less than the fin length 122. As the fluid enters the fin channel 132, the fluid may be configured to funnel along the entire fin channel length 134. In some embodiments, each fin channel length 134 of the one or more fin channels 132 may be the same or may be different.

Figure 6B:
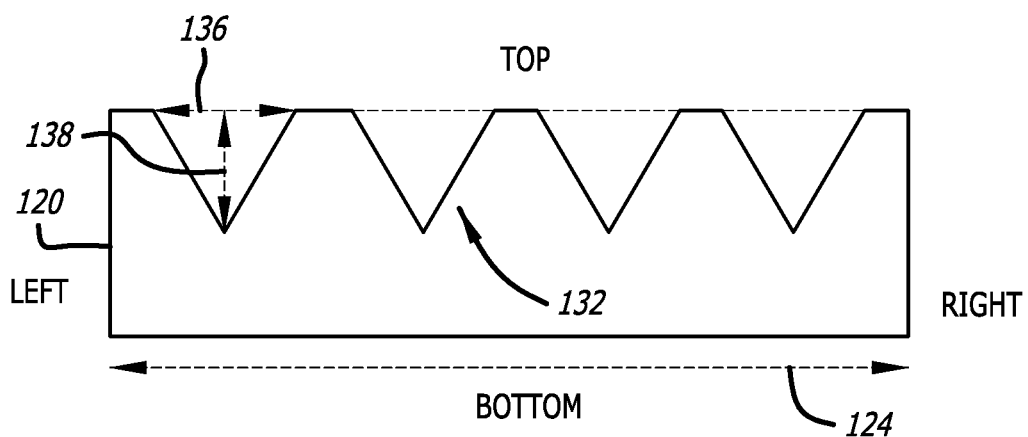
FIG. 6B illustrates a cross sectional view of the fin of FIG. 6A, in accordance with some embodiments.

FIG. 6B illustrate a cross sectional view of the fin 120 of FIG. 6A, having the one or more fin channels 132, in accordance with some embodiments. In some embodiments, the one or more fin channels 132 may include a fin channel width 136 and fin channel depth 138. In some embodiments, the fin channel width 136 and the fin channel depth 138 may be consistent along the entire fin channel length 134. In some embodiments, the fin channel width 136 may be tapered from a first fin channel width to a larger second fin channel width or from a larger first fin channel width to a small second fin channel width and the fin channel depth 138 may be tapered from a first fin channel depth to a larger second fin channel depth or the from a larger first fin channel depth to a smaller second fin channel depth. In some embodiments, the tapered fin channel depth 138 may use gravity flow to funnel fluid towards the one or more drainage channels 140. For example, the fin channel depth 138 may be configured to have a shallower first fin channel depth 138 at the top of the fin 120 and a deeper second fin channel depth 138 at the bottom of the fin 120 to allow more fluid to accumulate or funnel to the fin channel 132.

Figure 6C:
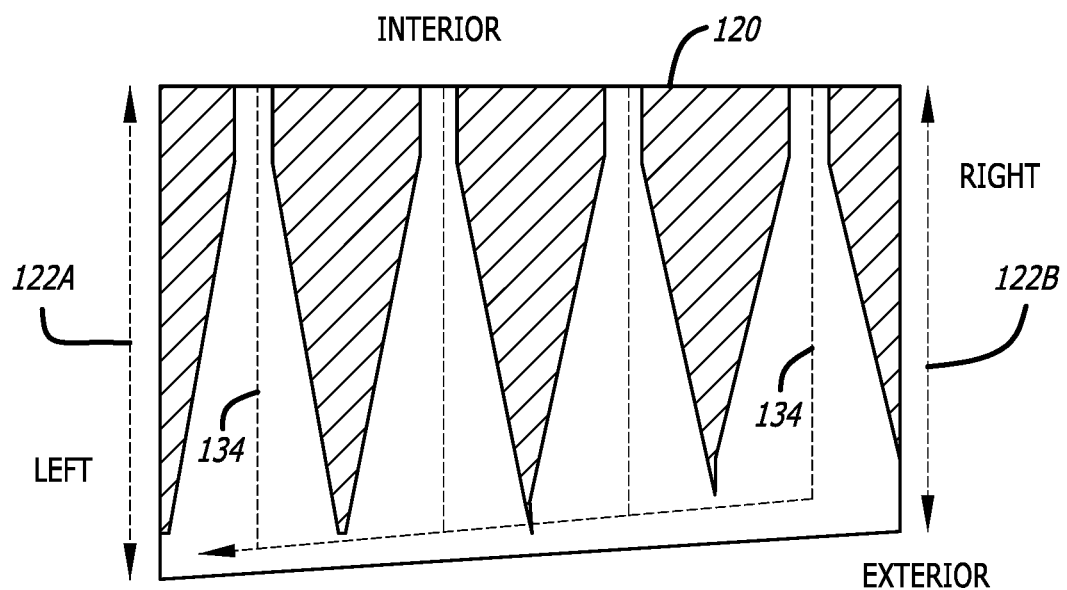
FIG. 6C illustrates a plan view of the fin, including one or more fin channels, in accordance with some embodiments.

FIG. 6C illustrates a plan view of the fin 120, in accordance with some embodiments. In some embodiments, the fin length 122 may be varied in order to bias the fluid flow towards one of the drainage channels 140. For example, as illustrated in FIG. 6C, a right fin length 122B may be shorter than a left fin length 122A. The shorter right fin length 122B biases fluid from the right fin channels 130 towards the left fin channels 130 and to the drainage channel 140. In some embodiments, wherein each fin 120 has a plurality of fin channels 132, each fin channel length 134 may be different. For example, as illustrated in FIG. 6C, the fin channel lengths 134 increase as the fin channels 132 move from the right side of the fin 130 to the left side of the fin 120.

Figure 6D:
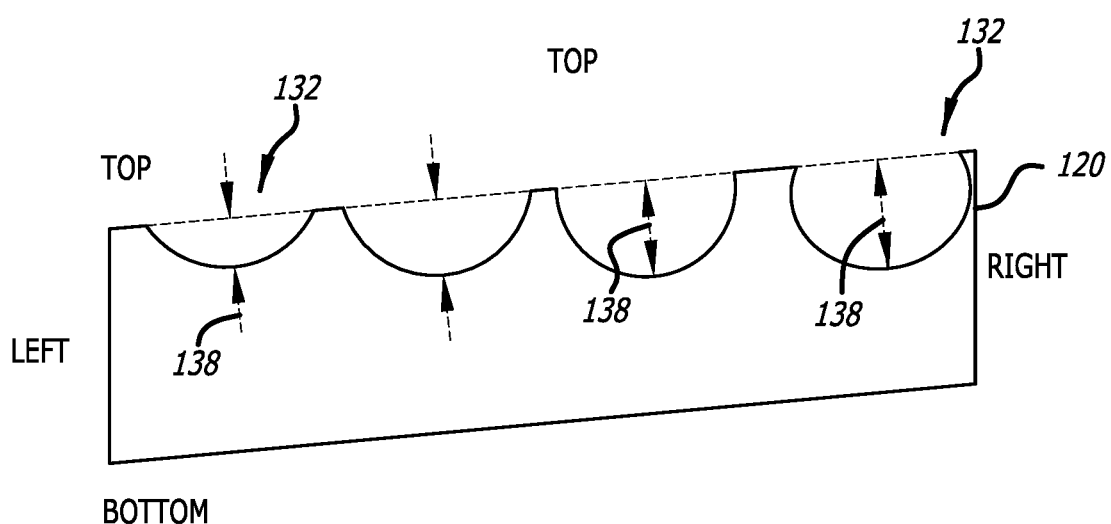
FIG. 6D illustrates a cross sectional view of the fin of FIG. 6C, in accordance with some embodiments.

FIG. 6D illustrates a cross sectional view of the fin 120 of FIG. 6C, the fin 120 having the one or more fin channels 132 in accordance with some embodiments. In some embodiments, the fin channel depth 138 may be varied to bias fluid to move from the fin channels 132 to the drainage channels 140. For example, as illustrated in FIG. 6D, the fin channel depth 138 decreases as the fin channels 132 move from the right side of the fin 120 to the left side of the fin 120.

Figure 6E:
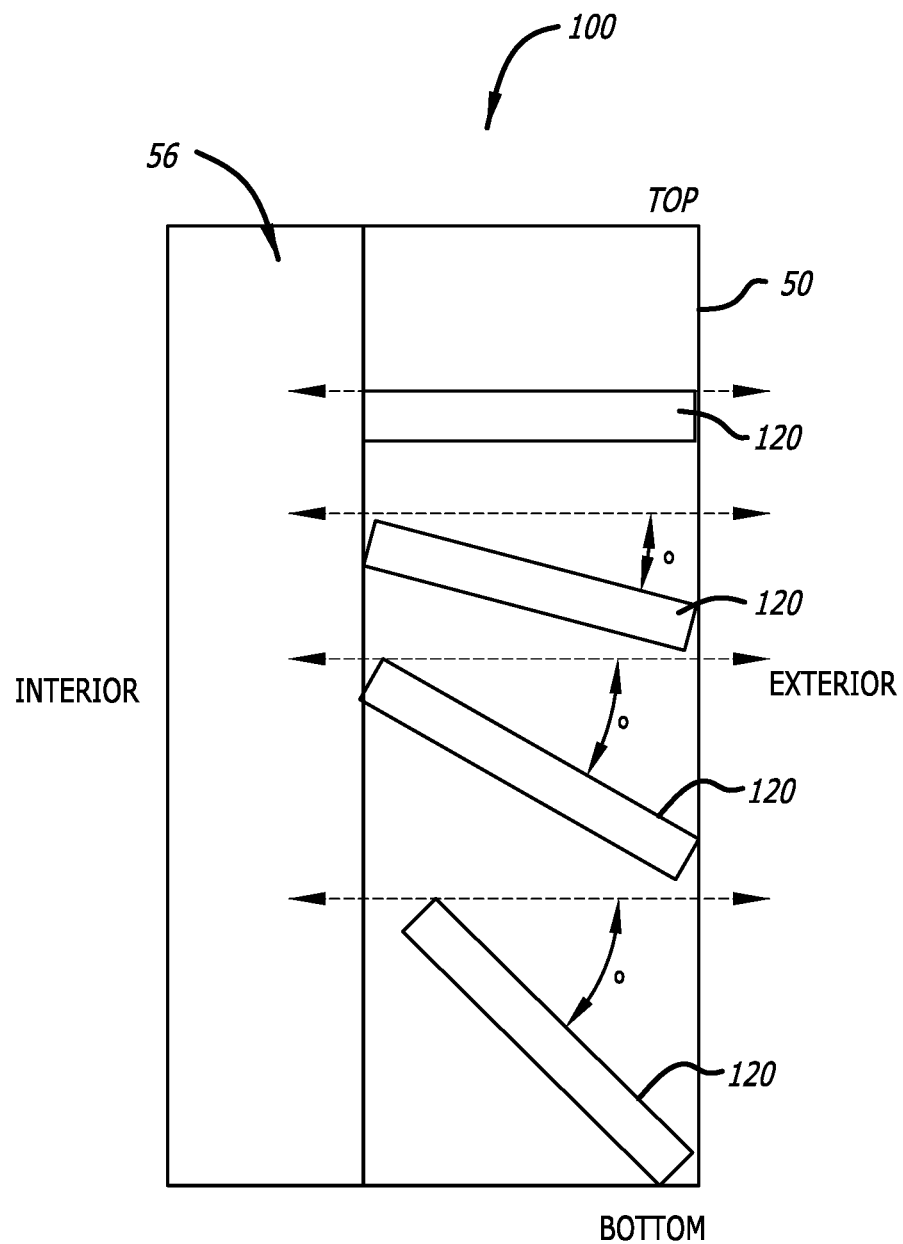
FIG. 6E illustrates a side cross sectional view of the venting system, in accordance with some embodiments.

FIG. 6E illustrates a cross sectional side view of the venting system 100 integrated into the electronic device 50, in accordance with some embodiments. In some embodiments, the plurality of fins 120 may be configured to be horizontal in relation to the top of the electronic device 50. In some embodiments, the plurality of fins 120 may be angled downward in relation to the top of the electronic device 50 to bias fluid to move by gravity flow from the interior to the exterior. In some embodiments, the tops of the plurality of fins 120 may be sloped downward at any angle through the range of and including 0° to −70°. In some embodiments, as illustrated in FIG. 6E, the top of each fin of the plurality of fins 120 may be sloped downward at a different angle through the range of and including 0° to −70° in relation to the top of the electronic device 50.

Figure 7:
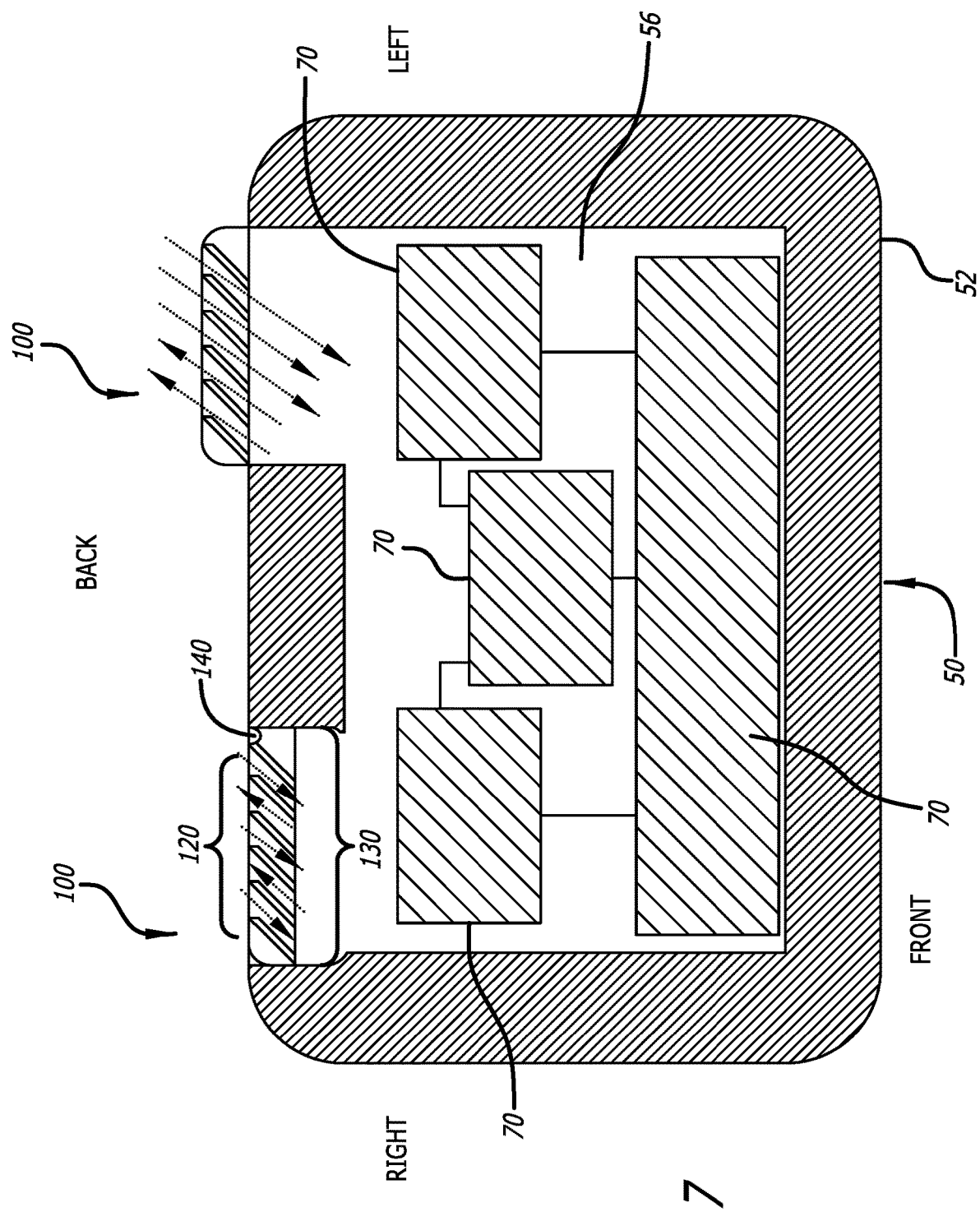
FIG. 7 illustrates a plan view of the electronic device including the venting system, in accordance with some embodiments.

FIG. 7 illustrates a plan view of the electronic device 50 including the venting system 100, in accordance with some embodiments. The venting system 100 includes the plurality of fins 120 defining the plurality of vent apertures 130 providing fluid communication between the internal cavity 56 and the external surface 54. In some embodiments, the plurality of fins 120 defining the plurality of vent apertures 130 may be organized in horizontal columns. The horizontal columns may be attached to the external surface 54 as illustrated on the left side of FIG. 7 or may be formed integrally with the body 52 as illustrated on the right side of FIG. 7. In some embodiments, the plurality of fins 120 may be configured to be angled from right to left. Air may be drawn into or may flow out of the internal cavity 56 through the plurality of vent apertures 130. The continual air flow through the plurality of vent apertures 130 may be configured to cool the one or more electronic systems 70 within the internal cavity 56. It can be appreciated that similar measures of channeling of fluid, redirecting of fluid, and drainage of fluid may be used internally within the electronic device 50 to channel any incidental fluid that was not redirected externally, away from the electronic systems 70 and other sensitive internal components.

Figure 8:
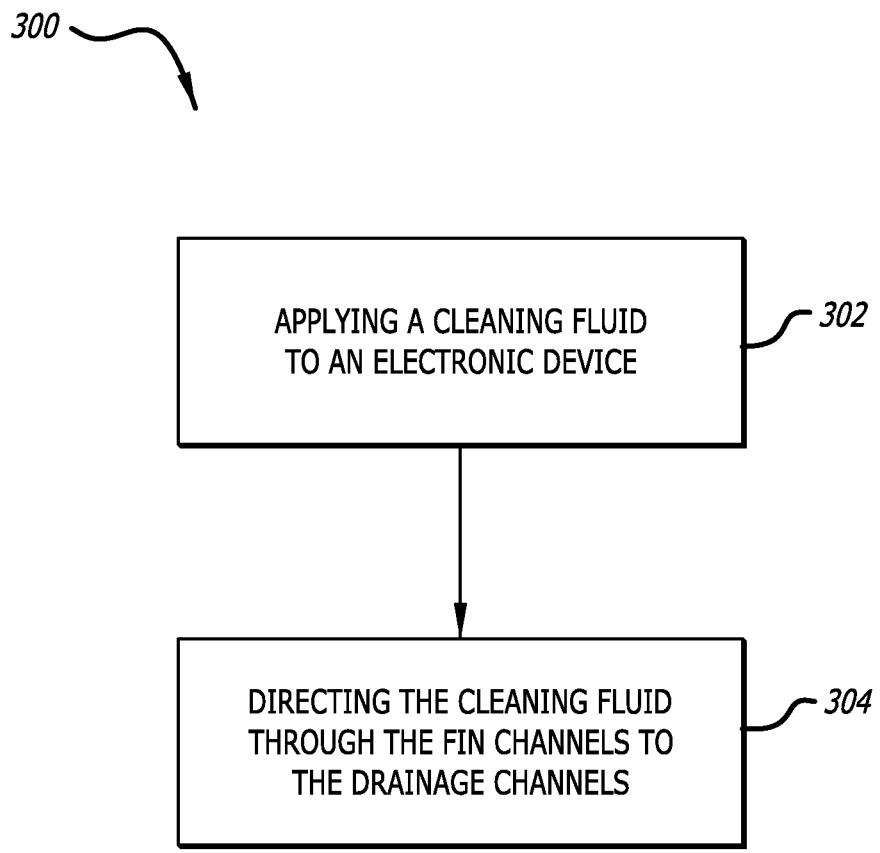
FIG. 8 illustrates a flow chart of an exemplary method of cleaning an electronic device, in accordance with some embodiments.

FIG. 8 illustrates a flow chart of an exemplary method 300 of cleaning an electronic device 50, in accordance with some embodiments. In some embodiments, the method 300 includes applying a cleaning fluid to the electronic device 50 having the internal cavity 56 including the one or more electronic systems 70 therein (block 302). In some embodiments, the electronic device 50 includes the venting system 100 having the plurality of fins 120 defining the plurality of vent apertures 130. In some embodiments, the plurality of fins 120 include a plurality of fin channels 132 in fluid communication with the two or more drainage channels 140. In some embodiments, the plurality of vent apertures 130 may be configured to be in fluid communication with the internal cavity 56. In some embodiments, applying may include dripping the cleaning fluid onto the electronic device 50, spraying the cleaning fluid onto the electronic device 50, misting the cleaning on the electronic device 50, submerging the electronic device 50 in the cleaning fluid, or the like. In some embodiments, applying includes applying the cleaning fluid directly to the electronic device 50 or applying the cleaning fluid indirectly by applying the cleaning fluid to a cleaning apparatus (e.g., a disposable cloth, a sponge, or the like) and applying the cleaning apparatus to the electronic device 50.

The method 300 further includes directing the cleaning fluid through the fin channels 132 away from the plurality of vent apertures 130 to the drainage channels 140, to mitigate fluid ingress into the internal cavity 56 of the electronic device 50 (block 304). In some embodiments, directing includes directing by gravity flow. In some embodiments, directing including using a hydrophobic coating on a portion of the fins 120 or a portion of the fin channels 132 to direct the cleaning fluid through the fin channels 132 away from the plurality of vent apertures 130 to the drainage channels 140. In some embodiments, directing includes using a plurality of super-hydrophobic structures on a portion of the fins 120 or a portion of the fin channels 132 to direct the cleaning fluid to direct the cleaning fluid through the fin channels 132 away from the plurality of vent apertures 130 to the drainage channels 140.

While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures may be made from the particular embodiments disclosed herein without departing from the scope of the concepts provided herein.

What is claimed is:

1. An electronic device having a top side and a bottom side and including one or more electronic systems disposed therein, the electronic device comprising:
   a body having an external surface and defining an internal cavity; and
   a venting system, comprising:
      a plurality of vent apertures disposed on the external surface and providing fluid communication with the internal cavity of the body;
      a plurality of fins extending outwards from the external surface, a fin of the plurality of fins extending over at least a portion of an adjacent vent aperture of the plurality of vent apertures;
      one or more fin channels, a fin channel of the one or more fin channels disposed on an upper surface of the fin and configured to direct fluid away from a vent aperture of the plurality of vent apertures; and
      one or more drainage channels disposed on the external surface of the body and in fluid communication with the fin channel.

2. The electronic device according to claim 1, wherein the venting system is coupled to the body of the electronic device.

3. The electronic device according to claim 1, wherein the venting system is integrated into the body of the electronic device.

4. The electronic device according to claim 1, wherein an axis of the fin channel extends from the internal cavity to the external surface of the electronic device to exterior the electronic device.

5. The electronic device according to claim 1, wherein the one or more fin channels and the one or more drainage channels include open channels.

6. The electronic device according to claim 1, wherein the plurality of fins and the plurality of vent apertures are organized into one or more vertical or horizontal columns.

7. The electronic device according to claim 1, wherein the one or more drainage channels are oriented vertically and are adjacent to the plurality of fins.

8. The electronic device according to claim 1, wherein the fin channel includes a fin channel width extending perpendicular to an axis of the fin channel, a fin channel length extending parallel to the axis of the fin channel and a fin channel depth extending inwards from a surface of the fin.

9. The electronic device according to claim 8, wherein the fin channel width increases or decreases along the fin channel length.

10. The electronic device according to claim 8, wherein the fin channel depth increases or decreases along the fin channel length.

11. The electronic device according to claim 8, wherein the one or more fin channels are U-shaped, C-shaped, or V-shaped.

12. The electronic device according to claim 5, wherein the one or more drainage channels are U-shaped, C-shaped, or V-shaped.

13. The electronic device according to claim 1, wherein the one or more fin channels or the one or more drainage channels include enclosed channels.

14. The electronic device according to claim 13, wherein the one or more drainage channels include microfluidic tubes.

15. The electronic device according to claim 1, wherein at least a portion of each fin of the plurality of fins includes a hydrophobic coating or a plurality of super-hydrophobic structures thereon.

16. The electronic device according to claim 1, wherein the one or more drainage channels include a hydrophobic coating or a plurality of super-hydrophobic structures thereon.

17. The electronic device according to claim 1, wherein the plurality of fins are sloped downward at an angle of between 0° to −70° relative to an axis extending normal to the external surface.

18. The electronic device according to claim 1, wherein the fin of the plurality of fins includes a first fin channel in fluid communication with a first drainage channel disposed on a left side of the plurality of fins and a second fin channel in fluid communication with a second drainage channel disposed on a right side of the plurality of fins.

19. The electronic device according to claim 1, wherein the fin channel communicates with a horizontal drainage channel of the one or more drainage channels extending between a left side and a right side of the plurality of fins, and wherein the horizontal drainage channel is in fluid communication with a vertical drainage channel of the one or more drainage channels extending along the left side or the right side of the plurality of fins.

\* \* \* \* \*